US012225319B2

(12) United States Patent
Tamura et al.

(10) Patent No.: US 12,225,319 B2
(45) Date of Patent: Feb. 11, 2025

(54) SYSTEMS AND METHOD FOR IMAGE NORMALIZATION

(71) Applicants: TOYOTA MOTOR EUROPE, Brussels (BE); KATHOLIEKE UNIVERSITEIT LEUVEN, Leuven (BE)

(72) Inventors: Kazuki Tamura, Brussels (BE); Hiroaki Shimizu, Brussels (BE); Marc Proesmans, Leuven (BE); Frank Verbiest, Leuven (BE); Luc Van Gool, Leuven (BE)

(73) Assignees: TOYOTA JIDOSHA KABUSHIKI KAISHA, Toyota (JP); KATHOLIEKE UNIVERSITEIT LEUVEN, Leuven (BE)

( * ) Notice: Subject to any disclaimer, the term of this patent is extended or adjusted under 35 U.S.C. 154(b) by 497 days.

(21) Appl. No.: 17/425,028

(22) PCT Filed: Feb. 15, 2019

(86) PCT No.: PCT/EP2019/053885
§ 371 (c)(1),
(2) Date: Jul. 22, 2021

(87) PCT Pub. No.: WO2020/164744
PCT Pub. Date: Aug. 20, 2020

(65) Prior Publication Data
US 2022/0132049 A1 Apr. 28, 2022

(51) Int. Cl.
*H04N 5/262* (2006.01)
*B60K 35/00* (2024.01)
(Continued)

(52) U.S. Cl.
CPC ........ *H04N 5/2628* (2013.01); *B60W 60/001* (2020.02); *G06T 5/80* (2024.01);
(Continued)

(58) Field of Classification Search
CPC .............. H04N 5/2628; B60W 60/001; B60W 2420/42; G06T 5/006; G06T 7/80;
(Continued)

(56) References Cited

U.S. PATENT DOCUMENTS

2014/0104424 A1* 4/2014 Zhang ..................... G06T 3/047
348/148
2015/0178884 A1 6/2015 Scholl et al.
(Continued)

FOREIGN PATENT DOCUMENTS

JP 2009-288885 A 12/2009
JP 2017-513434 A 5/2017
(Continued)

*Primary Examiner* — Chan S Park
*Assistant Examiner* — Daniel C Chang
(74) *Attorney, Agent, or Firm* — Dickinson Wright, PLLC

(57) ABSTRACT

A system for producing a virtual image view for a vehicle is provided. The system includes one or more image capture means configured to capture image data in proximity to the vehicle, the image data being defined at least in part by first viewpoint parameters, and to provide an identifier identifying the respective one or more image capture means, storage means configured to store a plurality of virtualization records containing conversion information related to a virtualized viewpoint and a plurality of image capture means, and processing means. The processing means are configured to receive the captured image data, convert the first viewpoint parameters of the captured image data into virtual viewpoint parameters based on the conversion information associated with a virtualization record stored by the storage means, to result in the virtual image view, wherein the virtualization record is identified at least based on the
(Continued)

identifier, and execute at least one driver assistance and/or automated driving function based on the virtual image view.

13 Claims, 4 Drawing Sheets

(51) Int. Cl.
  *B60K 35/23* (2024.01)
  *B60W 60/00* (2020.01)
  *G06T 5/80* (2024.01)
  *G06T 7/80* (2017.01)

(52) U.S. Cl.
  CPC ............... *G06T 7/80* (2017.01); *B60K 35/00* (2013.01); *B60K 35/23* (2024.01); *B60K 2360/21* (2024.01); *B60W 2420/403* (2013.01); *G06T 2207/30252* (2013.01)

(58) Field of Classification Search
  CPC .......... G06T 2207/30252; B60K 35/00; B60K 2370/1529; B60K 2370/21; G06V 20/56
  See application file for complete search history.

(56) References Cited

U.S. PATENT DOCUMENTS

| | | | |
|---|---|---|---|
| 2017/0136948 A1* | 5/2017 | Sypitkowski | H04N 5/265 |
| 2017/0334356 A1 | 11/2017 | Fujita | |
| 2020/0202498 A1* | 6/2020 | Raduta | G05D 1/0231 |

FOREIGN PATENT DOCUMENTS

| | | |
|---|---|---|
| JP | 2017-208690 A | 11/2017 |
| JP | 2018-533098 A | 11/2018 |
| WO | 2017/122552 A1 | 7/2017 |
| WO | 2017/217411 A1 | 12/2017 |

* cited by examiner

SYSTEMS AND METHOD FOR IMAGE NORMALIZATION

RELATED APPLICATION

This application is a 371 of International Patent Application No. PCT/EP2019/053885, filed on Feb. 15, 2019, including the specification, drawings and abstract, the entire disclosure of which is incorporated herein by reference.

FIELD OF THE DISCLOSURE

The present disclosure is related to systems and methods for automotive driver assistance, and more particularly, to virtualization of one or more images obtained from installed vehicle cameras.

BACKGROUND OF THE DISCLOSURE

Vehicles equipped with one or more cameras have become more common in recent years. These cameras have been introduced for various reasons, for example, visual feedback, parking assistance, collision avoidance, traffic guidance, etc., and have become an important input modality for autonomous driving and automated driving assistance.

These cameras generally present different properties (e.g., optical properties), described by—for instance—pinhole and fisheye lens models, as well as different installation locations on a particular vehicle.

Software designed and developed for automotive or automation applications typically expects images from a predefined viewpoint that is assumed for the one or more cameras installed in the vehicle, and the performance may degrade, or even cease, when the viewpoint provided by the one or more cameras is not within the assumed specifications.

Some existing systems implement a camera device for improving recognition accuracy and robustness. The manufacturers of vehicles use front-mounted camera devices and means for combining signals with data relating to the driving state of the vehicle. Further still, means for combining image signals with navigation device output has also been implemented.

US 2016/360104 discloses systems and methods for producing a combined view from a fisheye camera.

SUMMARY OF THE DISCLOSURE

The present inventors have recognized that for mass production of a plurality of vehicle models, a number of issues arise because differences in viewing angle(s) in the camera setup for each specific and different vehicle type has a different geometry. This may result in viewpoint differences as well because of mounting constraints and/or limitations during the production process.

The impact of these issues on the processing system may be complicated for traditional camera setups (e.g., pinhole), but the effect can be even more substantial for fisheye cameras.

According to embodiments of the present disclosure, a system for producing a virtual image view for a vehicle is provided. The system includes one or more image capture means configured to capture image data in proximity to the vehicle, the image data being defined at least in part by first viewpoint parameters, and to provide an identifier identifying the respective one or more image capture means, storage means configured to store a plurality of virtualization records containing conversion information related to a virtualized viewpoint and a plurality of image capture means, and processing means. The processing means is configured to receive the captured image data, convert the first viewpoint parameters of the captured image data into virtual viewpoint parameters based on the conversion information associated with a virtualization record stored by the storage means, to result in the virtual image view, wherein the virtualization record is identified at least based on the identifier, and execute at least one driver assistance and/or automated driving function based on the virtual image view.

By providing such a system, data associated with one or more captured images and/or scenes surrounding a vehicle may be virtualized and normalized to a view desired by a particular processing application. For example, where a fisheye camera is provided on a side of a first vehicle model, and pinhole camera is provided on a side of second vehicle model, a single processing application installed on both the first and second vehicle may receive a nearly identical virtualized view, despite differences in camera type, camera install angle, camera location, etc. Thus, one processing application may be implemented across an entire fleet of mass produced models.

In addition, because individual differences among cameras may exist, these differences may be rendered effectively undiscernible to the processing application by way of viewpoint parameter virtualization.

The conversion information may include at least one of distortion compensation information, image rectification information, image refraction information, and rotational information.

Each virtualized viewpoint may be defined by at least one of a resolution and a field of view, and at least one of a pinhole model, a fisheye model, a cylindrical model, a spherical model, and a rectilinear model.

The storage means may include means for identifying a processing application linked to a virtual image view.

The storage means may include a lookup table linking a camera identifier with conversion information for generation of the virtual image view required by the processing application.

The conversion information may include calibration parameters for an identified image capture means, and the processing means may be configured to verify the calibration parameters for each of the one or more image capture means.

The processing application may include at least one of an object detection and tracking application and a lane identifier application.

According to further embodiments, a vehicle including the system described above is provided.

According to still further embodiments, a method for producing a virtual image view for a vehicle is provided. The method includes receiving image data captured by at least one image capture means from surroundings of the vehicle, the image data being defined at least in part by first viewpoint parameters, receiving an identifier identifying one or more image capture means providing the image data, determining a virtualization record containing conversion information related to a virtualized viewpoint and a plurality of image capture means, wherein the virtualization record is determined at least based on the identifier, converting the first viewpoint parameters of the captured image data into virtual viewpoint parameters based on the conversion information associated with the determined virtualization record, to result in the virtual image view, and executing at least one driver assistance and/or automated driving function based on the virtual image view.

The conversion information may include at least one of distortion compensation information, image rectification information, image refraction information, and rotational information.

Each virtualized viewpoint may be defined by at least one of a resolution and a field of view, and at least one of a pinhole model, a fisheye model, a cylindrical model, a spherical model, and a rectilinear model.

The determining may include identifying a processing application linked to a virtual image view.

The determining may include searching a lookup table, the lookup table including information linking a camera identifier with conversion information for generation of the virtual image view required by the processing application.

The conversion information may include calibration parameters for an identified image capture means, and the method further comprising verifying the calibration parameters for each of the one or more image capture means.

The processing application may include at least one of an object detection and tracking application and a lane identifier application It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
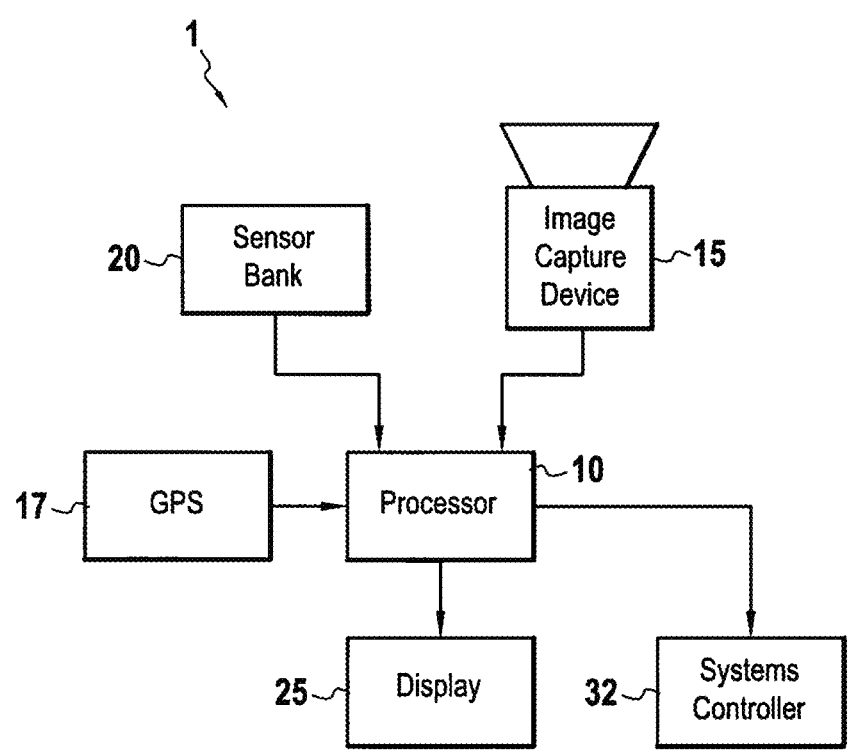
FIG. 1 shows a schematic view of an exemplary image virtualization system of a vehicle according to embodiments of the disclosure.

FIG. 1 shows a schematic view of an exemplary image normalization system of a vehicle. The driver assistance system 1 may include processing means, such as an electronic control unit (ECU) 10, one or more cameras 15, one or more sensors 20, systems controller 32, and a display 25 among others.

A global positioning system (GPS) 17, corresponding to a location providing means, is also provided for providing map data (e.g., location information such as coordinates) regarding location of the vehicle and feature information regarding features (e.g., regulation indicators, traffic signals, exit lanes, etc.) in proximity to the vehicle.

Image capture means 15, may include, for example, one or more cameras and/or other suitable devices configured to obtain optical data from an area surrounding a vehicle (e.g., in front of, sides, and rear of a vehicle). Image capture means 15 may be configured to process the optical data obtained from the surroundings of the vehicle and to output a signal transmitting the data. Such image capture means 15 are known in the art, and one of skill in the art will understand that any such image capture means 15 may be implemented in the present system without departing from the scope of the present disclosure. For example, image capture means 15 may comprise a pinhole camera, a fisheye camera, cylindrical camera, a spherical camera, etc.

Image capture means 15 may be located at various positions on a vehicle so as to provide an adequate field of view 4 of the surroundings of the vehicle (e.g. a front and side views covering as much as 360 degrees around the vehicle). For example, one or more image capture means 15 may be located behind the windshield, on a front bumper, a side view mirror, rearview mirror, rear window, rear bumper, and/or any other suitable mounting location on the vehicle so as to provide a field of view 4 of surrounding objects, including other vehicles present on the presently driven motorway.

According to some embodiments it may be desirable to minimize visibility of image capture means 15 on the vehicle for aesthetic reasons, and one of skill in the art will understand that finding a mounting location suitable to achieve this goal while also providing adequate field of view surrounding the vehicle to be a reasonable consideration. Further, one of skill will recognize that depending on a vehicle design, placement of image capture means 15 may vary across models, and depending on placement of each image capture means 15, the output data may have different initial parameters of, for example, rotation, distortion, refraction, etc.

The term "adequate" when referring to field of view as used herein shall mean a field of view providing image capture means 15 with the ability to provide image data at a great enough distance so as to provide adequate time to ECU 10 for responding to the presence of objects and other features (e.g., lane lines 210, vehicle 250, road conditions 200, etc.) in the field of view of image capture means 15 in an autonomously driven scenario. For example, an "adequate" field of view to the right or left of the vehicle would include a view of a lane immediately next to the vehicle or two or more lanes away from the vehicle and any other vehicles and lane markers traveling in/belonging to those lanes.]

Image capture means 15 may be configured to provide data regarding surroundings of a vehicle to ECU 10, in addition to an identifier enabling identification of image capture means 15 by ECU 10. Image capture means 15 may provide such data to ECU 10 via a wired connection, a wireless connection, or other suitable method for transferring data to ECU 10. For example, image capture means 15 may include wireless communication means (e.g. IEEE 802.11 compliant Wi-Fi hardware, Bluetooth, etc.) for transmitting data to ECU 10 and/or other devices that may use the data from image capture means 15.

Alternatively or in addition, for example for safety purposes, a wired connection may be provided. Such a wired connection may be provided, for example, to provide fail-safe when a wireless connection should cease to function, for example, due to interference or transceiver abnormalities.

An identifier for an image capture means 15 may comprise, for example, one or more digits, numbers and/or letters, and may, for example, be unique to an image capture means. Alternatively, an identifier may serve to identify, more generically, a position and type of camera. For example, one or more digits of an identifier may indicate/correspond to a type of camera (e.g., fisheye, cylindrical, etc.) while one or more digits may indicate an installed location on a vehicle, and/or a vehicle model on which it is installed. One of skill will understand that various schemes may be implemented for identifiers, and that any such scheme is intended to fall within the scope of the present disclosure.

As noted above, the various image capture means 15 installed/mounted on a vehicle may vary not only by type and installed position, but also by various viewpoint parameters, such as, for example, rotation, resolution, distortion, projection model, field of view, etc. Viewpoint parameters for each image capture means 15 may therefore, be stored in a table, and referenced, by for example, an identifier. For example, certain image capture means 15 may capture image data at a resolution of 1024×768 pixels, while others may capture at full 1080 p (i.e., 1900×1080 pixels). A processing application may expect an image resolution of 800×600 pixels, and therefore, it is desirable to convert each dataset of each image capture means 15 may be converted to a resolution of 800×600 for that particular processing application.

Figure 2A:
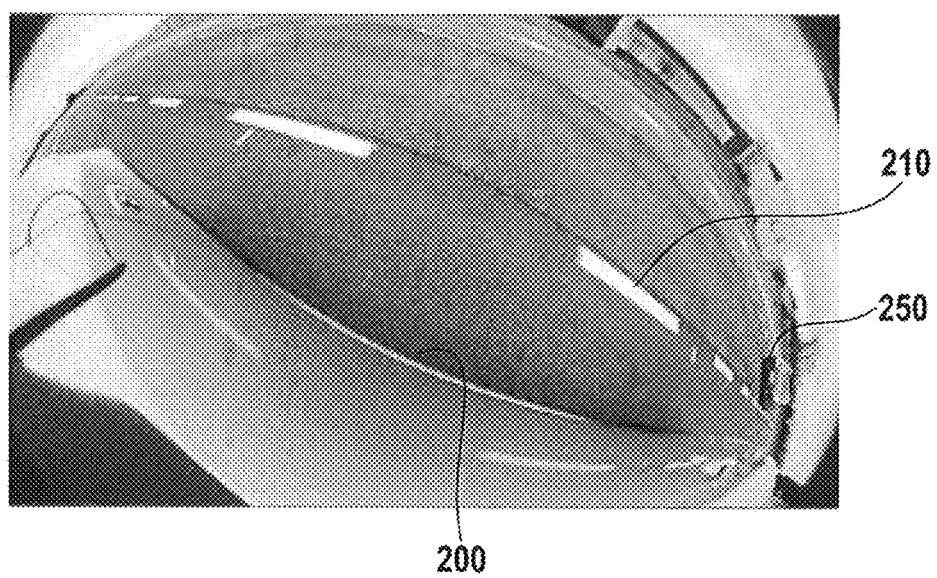
FIG. 2A shows an exemplary image captured from a first camera installed on a vehicle.
Figure 2B:
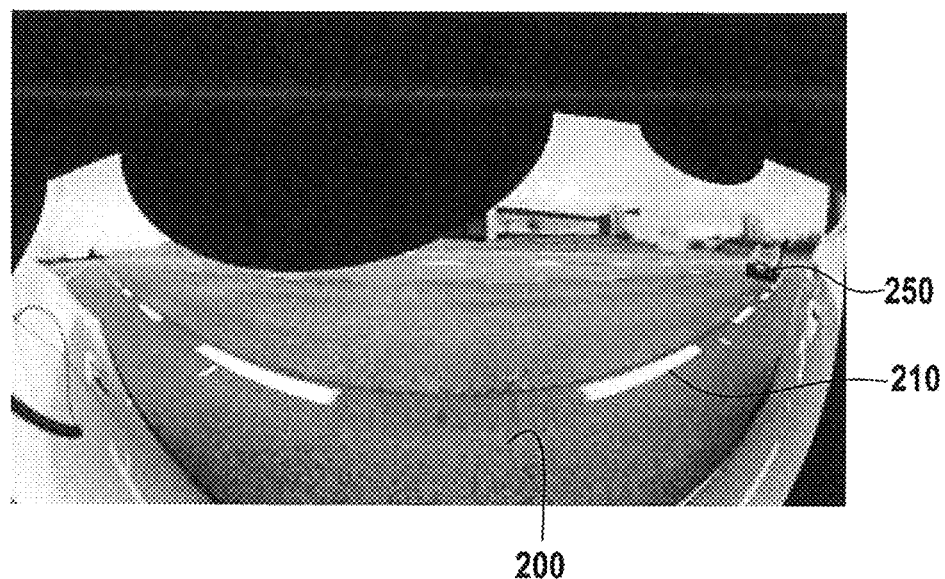
FIG. 2B shows the captured image normalized according to embodiments of the present disclosure.
Figure 3A:
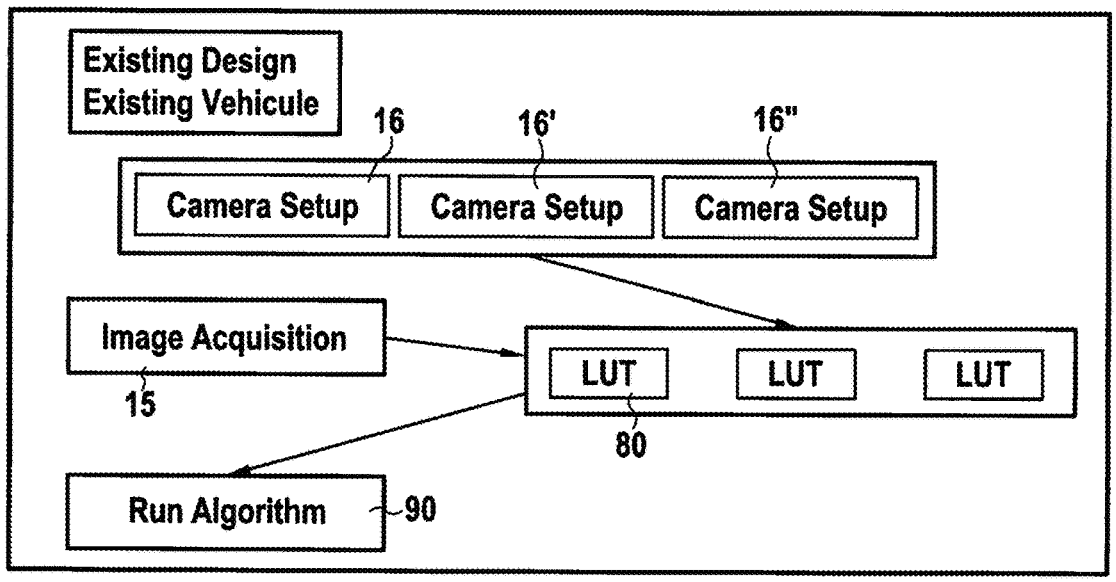
FIG. 3A shows a logical grouping of information associated with one or more camera setups and associated data.
Figure 3B:
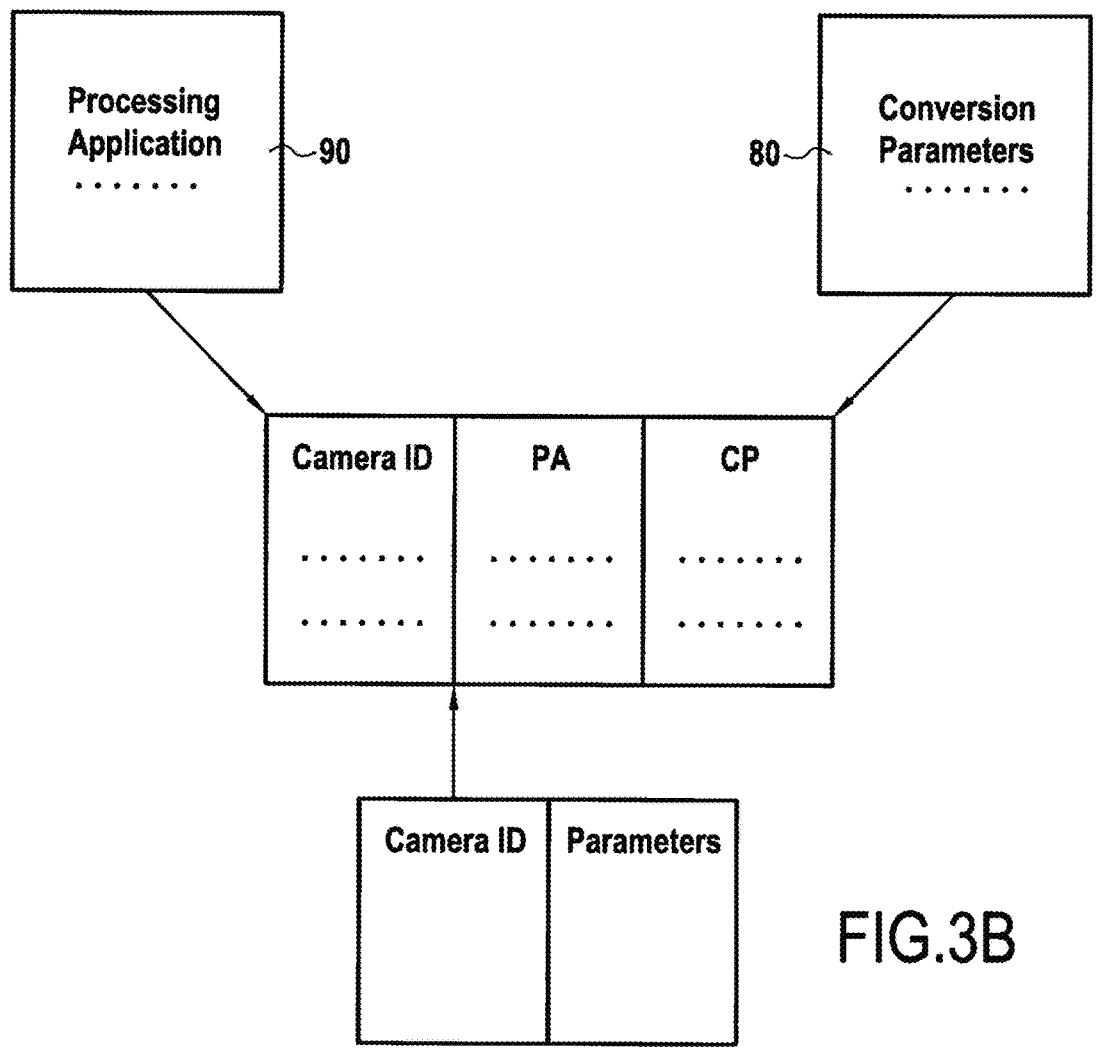
FIG. 3B shows an exemplary data diagram related to transformation information and processing applications.

FIGS. 2A and 2B show an exemplary image captured from a first camera installed on a vehicle and the captured image normalized according to embodiments of the present disclosure, respectively. FIGS. 3A and 3B highlight a logical grouping of information associated with one or more camera setups and associated data (e.g., viewpoint parameters) and an exemplary data diagram related to transformation information and processing applications according to embodiments of the present disclosure.

As shown numerous camera setups $16_1$-$16_i$ may be present on any particular vehicle model, as well as varying across vehicle models. Therefore, tables 80 may be provided for linking a camera set up/identifier 16 with its intrinsic viewpoint parameters, and subsequently conversion parameters for such a camera set up $16_x$ with a processing application 90, thereby allowing conversion of image output data in image capture means 15 to viewpoint parameters expected by a processing application.

For example, as shown at FIG. 2A, an installed image capture means outputs an "unvirtualized" view having first viewpoint parameters including a rotation and a lens distortion (e.g., caused by a fisheye lens), for example. An object or lane line detection application may request the view from the image capture means. ECU 10 may thus, based on the application, check the lookup table based on the identifier of the image capture means.

Taking the first viewpoint parameters and the camera setup 16, based on the identifier for the camera, conversion information for converting the first viewpoint parameters to virtual viewpoint parameters may be obtained from the database. Such conversion information may indicate, for example, compensatory rotation and distortion values resulting in the virtualized view shown at FIG. 2B. This virtualized view can then be used by the object detection application for a desired purpose.

According to examples shown at FIGS. 2A and 2B, the first viewpoint parameters for the image data of FIG. 2A (e.g., a fisheye projection model) may be defined by the following four tables:

TABLE 1

Camera Matrix (3 × 3 matrix)

| 338.1759919 | 0 | 644.4998055 |
|---|---|---|
| 0 | 338.1759919 | 403.6153106 |
| 0 | 0 | 1 |

TABLE 2

Radial Distortion

| −0.006448210017 | 0.06115093356 | −0.01489872136 |
|---|---|---|

TABLE 3

Rotation Matrix

| −0.3047415517 | 0.7943601275 | −0.5254755698 |
|---|---|---|
| 0.9319508488 | 0.3625064463 | 0.007529406374 |
| 0.1964693416 | −0.4874228803 | −0.850775372 |

TABLE 4

Translation Matrix

| −0.9463271281 | 0.7095791917 | 0.9865831897 |
|---|---|---|

The above first viewpoint parameters may then be converted, according to embodiments of the present disclosure, to rectilinear cylindrical virtual viewpoint parameters (as shown at FIG. 2B), for example, to facilitate objection detection. The conversion to the virtual viewpoint parameter virtualized image may be performed using conversion information from the lookup table 80 based on the processing application 90 and the camera identifier. The resulting converted virtual viewpoint parameters are demonstrated in the following 4 tables:

TABLE 5

Converted Camera Matrix (3 × 3)

| 368.2736511 | 0 | 640 |
|---|---|---|
| 0 | 368.2736511 | 403 |
| 0 | 0 | 1 |

TABLE 6

Converted Radial Distortion

| 0 | 0 | 0 |
|---|---|---|

TABLE 7

Converted Rotation Matrix

| 0.01249270748 | 0.04229977313 | −0.9990268549 |
|---|---|---|
| 0.9999219729 | −0.0007382465767 | 0.01247262821 |
| −0.0002099510197 | −0.9991046853 | −0.04230563897 |

TABLE 8

Converted Translation Vector

| −0.9463271281 | 0.7095791917 | 0.9865831897 |
|---|---|---|

For purposes of describing further the tables shown above, assume a pinhole camera is an original projection model camera installed on a vehicle. For the pinhole camera model, a 3D point M in a scene can be related to its projection m in an image such that:

$$\binom{m}{1} \approx KR^T(M-t) \quad (1)$$

where:
M=(X Y Z)T is a 3D point M of the scene, m=(x y)T is its projection in the camera image denotes ≈ equality up to a non-zero scalar multiple.

K is a 3×3 calibration matrix, R is the 3×3 rotation matrix representing the orientation of the camera, t is the translation vector t=(tx ty tz)T representing the position of the camera.

In this embodiment, it may be assumed that the aspect ratio is 1 and skew is 0. The calibration matrix K can be expressed as:

$$K = \begin{pmatrix} f & 0 & px \\ 0 & f & py \\ 0 & 0 & 1 \end{pmatrix} \quad (2)$$

where: f is the focal length (in pixels), and $p=(p_x\ p_y)^T$ the principal point of the camera. Consider point $Q=R^T(M-t)$ corresponding to the point M but expressed in the coordinate frame attached to the camera (the camera coordinate frame); and q the "normalized" projection of point Q, $$\binom{q}{1} = Q.$$

Then $$\binom{m}{1} \approx K\binom{q}{1} \text{ or } m = f \cdot q + p \quad (3)$$

For fisheye cameras, the image projection is formulated in terms of angles rather than normalized coordinates:

$$\theta = \operatorname{atan}\left(\frac{\sqrt{Qx^2 + Qy^2}}{Qz}\right),\ \psi = \operatorname{atan}\left(\frac{Qy}{Qx}\right),\ q\binom{\theta \cdot \cos(\psi)}{\theta \cdot \sin(\psi)}$$

To introduce radial distortion in the camera model, equation (3) may be rewritten as:

$$\binom{m}{1} \approx K\binom{D(q)}{1} \text{ or } m = f \cdot D(q) + p \quad (4)$$

The distortion function D( ) radially displaces the normalized projection before it is converted to image coordinates:

$$D(q) = d^*q,\ d = 1 + K_1\theta^2 + K_2\theta^4 + K_3\theta^6\ (+ \ldots)$$

where $K_1, K_2, K_3, \ldots$ are parameters defining the radial distortion in the images of the camera. For this specific example, the first three tables above contain 3 parameters to describe the radial distortion, but it should be noted that the formulation is not limited to 3 parameters).

For virtual cameras, the model projection can be chosen to be much simpler (e.g. radial distortion is eliminated), and a more intuitive image representation can be defined for the given computer vision algorithm. For the second three tables above, the data is used by an exemplary equirectangular cylindrical projection model. Formula (3) applies, where q is defined as:

$$\chi = \operatorname{atan}\left(\frac{Qx}{Qz}\right),\ \gamma = \operatorname{atan}\left(\frac{Qy}{\sqrt{Qx^2 + Qz^2}}\right),\ q = \binom{\chi}{\gamma}$$

According to some embodiments, first viewpoint parameters and output image data may facilitate a determination as to whether calibration of an associated image capture means 15 is correct.

For example, calibration may be checked using a single image, based on a priori known information of the surrounding structure of the vehicle, e.g., 1) shape and/or contour; and 2) information regarding the surrounding scene (e.g., road structure, parallel lines, map information, etc.). The projection constraints of the image data output can thus be compared with first viewpoint parameters (i.e., those expected to be provided by the camera 15) to determine whether the actual data and parameters correspond, and thereby, whether the camera 15 is calibrated.

Alternatively, or in addition, feature tracking across a sequence of images can also give information regarding 3-dimensional structures in the context of structure from motion. Using these 3-dimensional structures, calibration can be checked in a similar manner to that described above.

According to another example, because a vehicle typically includes more than one image capture means 15 installed thereon (e.g., two, four, six, eight, cameras, etc.), any overlap between the various image capture means 15 can further be exploited in terms of feature correspondence tracking and/or triangulation to check the surrounding 3D structure (as above, using SfM). The calibration can thus be checked based on the expected first viewpoint parameters compared with the actual parameters across the overlapping camera views.

According to some embodiments, the system for producing a virtual image view from the image capture means 15 may assume that the image capture means 15 and its associated output image data are correctly calibrated. Therefore, no automated calibration check may be performed, and the image data virtualized/normalized according to techniques described herein.

One or more sensors 20 may be configured to transmit state information related to a state of the vehicle to ECU 10. For example, a state of the vehicle may include a speed at which the vehicle is traveling, a direction in which the vehicle is traveling, a change of direction which the vehicle is undergoing and/or has undergone, a position of the steering wheel, a distance which the vehicle has traveled, etc.

Therefore, one or more sensors 20 may include, for example, a steering wheel position sensor, a vehicle speed sensor, a yaw rate sensor, among others. Such sensors, similarly to image capture means 15, may be configured to provide such state information wirelessly and/or by wire to ECU 10, and may further include duration information. Duration information associated with the state information may be tracked by ECU 10.

ECU 10 may include any suitable device configured to manipulate data, perform calculations, execute code for decision making, causing display of information to an operator of vehicle, and/or cause control of systems controller 32 to take action on one or more systems (e.g., steering, braking, etc.) of vehicle, in order to carry out embodiments of the present disclosure. For example ECU 10 may include various analog and/or digital circuits, and may include integrated circuits such as RISC processors, i386 processors, ASIC processors, etc. Typically, on-board computers in modern vehicles include such processors, and one of skill will understand that the present ECU 10 may be comprised by such an on-board computer, or may be separately provided. One of skill in the art will also understand that the exemplary circuits and processors described herein are not intended to be limiting, and that any suitable device may be implemented.

ECU 10 may be linked to one or more databases and/or other memory (e.g., RAM, ROM, etc.) associated with vehicle so as to enable storage of vehicle related data as well as values that may be utilized during processing of vehicle functions (e.g., viewpoint parameter conversion tables, processing applications, camera identifiers, etc.), such as object detection and recognition. One of skill in the art will recognize that information discussed herein with regard to any such databases and/or memory is not intended to be limiting.

ECU 10 may be configured to receive data from image capture means 15 so as to provide functionality associated with the present disclosure. For example ECU 10 may receive image data having first viewpoint parameters from one or more image capture means 15 and one or more sensors simultaneously (e.g., streaming data).

ECU 10 may further be configured to receive data from GPS 17, the data including location information and map information related to features in proximity to the location of the vehicle. Location information may include, for example, global coordinates enabling fixing/determining of a position of vehicle on a map, current and next link information indicating a link on which the vehicle currently travels (i.e., current link) and possible future travel paths (i.e., next links), as well as information regarding these current and next links (e.g., controlled access highway, city zone, among others), etc.

Features included in map information may comprise, for example, lane lines 210, exit lanes, conditional indicators (e.g., hours of activation, prohibited hours, weather condition, seasonal, etc.), topography, etc. One of skill will recognize that more or fewer features may be present in the map information as desired, the level of detail being dependent upon, for example, map information provider, among others. One of skill will further recognize that GPS 17 may form part of ECU 10, may be separate from ECU 10, or any level of combination between GPS 17 and ECU 10 may be implemented without departing from the scope of the present disclosure.

ECU 10 may be linked to one or more interfaces, e.g. network interfaces, which may be configured to receive wirelessly and/or by wire the data and information provided by image capture means 15, GPS 17, sensors 20, among others. Further, while the GPS 17 is described as present on vehicle, one of skill will understand that certain map data including features of lane lines 210, exit lanes, etc., may be stored remotely and transmitted to GPS 17 and/or ECU 10, for example, via 4G, such that up to date information is available.

According to some embodiments, vehicle may include one or more system controllers 32, which may be configured to receive information and/or commands from ECU 10, and to execute those commands to control various vehicle systems (e.g., steering, braking, accelerator, etc.). Such devices may be configured to actively manipulate control systems 32 of vehicle, for example, to operate a steering system, a braking system, an acceleration system, etc.

Such devices may include one or more servo motors, actuators, etc., which may receive instructions from one or more systems of vehicle, for example ECU 10. Based on these instructions, vehicle may be controlled by an operator, ECU 10 in combination with system control 32, or both simultaneously (e.g., system controller 32 providing steering and braking assistance in a panic stop situation).

Display 25 may be configured to display information provided by ECU 10 to a driver of vehicle. FIG. 2 shows an exemplary display 25 providing information that may be of interest to a driver of vehicle. As shown at FIG. 2, a valid speed limit is among the information currently displayed to a driver on display 25.

Display 25 may be any suitable device for providing visible and/or audible information to a driver of vehicle. For example, display 25 may include a heads up display (e.g., on a windshield in front of a driver), a monitor, an in-dash display, etc.

Figure 4:
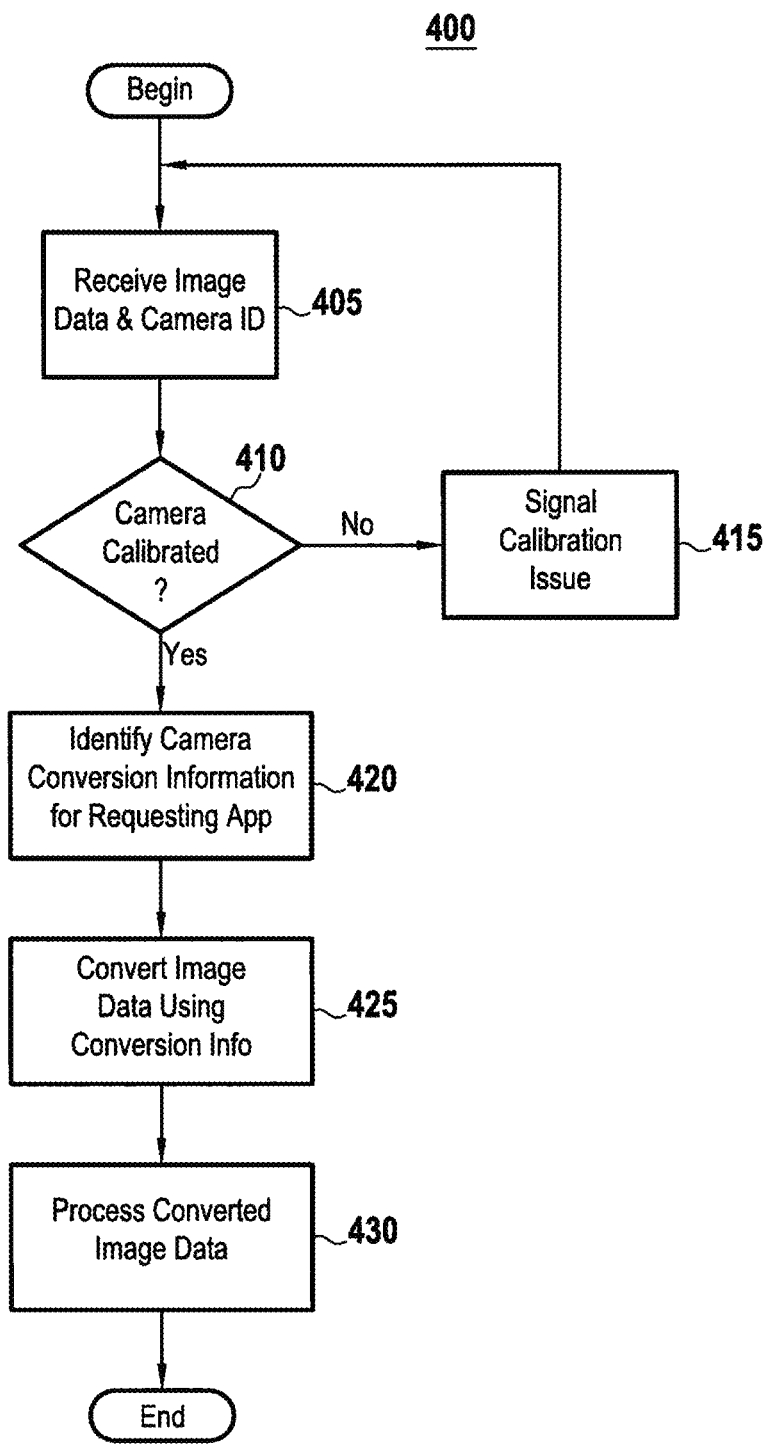
FIG. 4 is a flowchart highlighting an exemplary processing method according to embodiments of the present disclosure.

FIG. 4 is a flowchart 400 highlighting an exemplary processing method according to embodiments of the present disclosure. ECU 10 may receive image data from one or more image capture means 15 as well as an identifier associated with the image capture means 15 providing the image data (step 405). Such image data may comprise surroundings of the vehicle, for example, lane lines 210, road conditions 200, and other vehicles 250. The image data may be in video, still, or hybrid form. For example, one or more frames of video may be provided in conjunction with periodic still photos, e.g., where a particular traffic scene becomes complicated.

Upon receiving the image data, ECU 10 may check the image data to determine whether the image capture means 15 from which the data was received is properly calibrated (step 415). As noted above, such a calibration check may be optional, and according to some embodiments, no such calibration check may be performed.

Where such a calibration check is performed, and when ECU 10 determines that a calibration issue may exist (step 415: No), an operator of the vehicle may be notified (e.g., via display 25) that a calibration issue exists with one or more of the image capture means 15 (step 415). Based on the camera identifier, it may be possible to indicate to the operator which of the image capture means 15 is having calibration issues, and may therefore, facilitate correction/repair of the calibration issues.

According to some embodiments, it may be possible for image capture means 15 and/or ECU 10 to provide additional information regarding, for example, diagnostics related to calibration via an interface (e.g., display 25) for aiding in diagnosing and correcting calibration issues at a manufacturer certified repair facility, for example.

Following verification of calibration (where carried out), ECU 10 may then use the camera identifier provided at step 405 by the image capture means 15 providing the image data, to determine first viewpoint parameters (i.e., default output parameters) of the image data coming from the associated image capture means 15, and also virtualized viewpoint parameters for converting the first viewpoint parameters to a virtualized set (step 415). For example, using FIGS. 2A and 2B as an example, once the camera has been identified as providing the first viewpoint parameters according to FIG. 2A (e.g. fisheye, 20 degrees rotation, peripheral distortion), a processing application is identified (e.g. a lane line tracking application) utilizing/expecting a view having specific viewpoint parameters. Based on a correspondence stored in the database/lookup tables, virtualization parameters for converting a raw output image of the identified camera to the expected viewpoint parameters of the processing application may be identified and provided to ECU 10.

Following identification of the conversion information associated with the identified camera 15 and processing application, the image data (i.e., raw output of camera 15) may be converted to the virtualized viewpoint (e.g., as shown at FIG. 2B) by applying the conversion information to the image data output from camera 15 (step 425).

One of skill will understand that application of the conversion information to the camera output image data is well understood and need not be explained in detail. For purposes of example, however, it may be noted that where first viewpoint parameters include a rotation parameter of 30 degrees, for example, conversion information may indicate that a rotation of −30 degrees, or 390 degrees, for example, be applied to the output image data to result in the virtual viewpoint. One example of such a conversion can be seen above with regard to FIGS. 2A and 2B and the related description for tables 1-8.

According to some embodiments, additional conversion information in lookup table 80 may include conversion information for converting a projection model of a previously processed image, to a different expected projection model by a processing application 90. For example, where an image having a projection model of rectilinear cylindrical is received, but a processing application 90 expects an orthographic projection model (e.g., for a bird's-eye lane line detection application), lookup table 80 may include conversion information configured to convert the rectilinear cylindrical projection model to an orthographic projection model, among other conversions, as discussed above. In other words, even where an image has not been provided directly by a camera (e.g., somewhere during software processing, an image has been converted, and then subsequently provided in its converted format), the image may still be converted from its present projection model, to a desired projection model.

Similarly, where an image having a pinhole, fisheye, etc. projection model coming directly from a camera is received, but the processing application 90 expects the orthographic projection, lookup table 80 may provide conversion information to make the desired conversion.

Such conversion information according to some examples, may include rotation vectors configured to be applied to the rectilinear image information to result in a rectilinear cylindrical "normalized" image.

Once the virtual viewpoint has been achieved by application of the conversion information to the image data, the virtual viewpoint may be provided to the processing application for processing, and eventual control operations (step 430). For example, where the virtual viewpoint of FIG. 2B is considered, ECU 10 may evaluate input from sensors 20, and cause operation of various steering controls to maintain the vehicle within the identified lane lines 210 using systems controller 32, for example. One of skill in the art will recognize that other controls such as, for example, accelerators, brakes, etc. may also be operated by systems controller 32 as a result of commands from ECU 10 to cause a modification of the vehicles travel.

Based on embodiments of the present disclosure, it becomes possible to implement a processing application across multiple vehicle designs, the vehicle designs having various image capture means installed at a variety of locations, and providing a variety of raw image data views of surroundings of the vehicle. This is for at least the reason that first viewpoint parameters of the raw image data views may be converted from any vehicle, any install position, and any type of camera to a virtual viewpoint having characteristic parameters expected by the processing application. Therefore, it becomes unnecessary to redevelop processing applications 90 for each vehicle design and camera placement.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for producing a virtual image view for a vehicle, comprising:
   one or more image capture means configured to capture image data in proximity to the vehicle, the image data being defined at least in part by first viewpoint parameters, and to provide an identifier identifying the respective one or more image capture means;
   storage means configured to store a plurality of virtualization records containing conversion information related to a virtualized viewpoint, a plurality of image capture means, and to a plurality of processing applications comprising at least two among an object detection and tracking application and a lane identifier application; and processing means configured to:
receive the captured image data;
identify, among the plurality of processing applications, a processing application expecting virtual viewpoint parameters based on the captured image data;
select the processing application expecting virtual viewpoint parameters;
convert the first viewpoint parameters of the captured image data into the virtual viewpoint parameters of the selected processing application based on the conversion information associated with a virtualization record stored by the storage means, to result in the virtual image view, wherein the virtualization record is identified at least based on the identifier and on the identified processing application; and
execute at least one driver assistance and/or automated driving function based on the virtual image view.

2. The system for producing a virtual image view for a vehicle according to claim 1, wherein the conversion information comprises at least one of distortion compensation information, image rectification information, image refraction information, and rotational information.

3. The system for producing a virtual image view according to claim 1, wherein each virtualized viewpoint is defined by at least one of a resolution and a field of view; and
at least one of a pinhole model, a fisheye model, a cylindrical model, a spherical model, and a rectilinear model.

4. The system for producing a virtual image view according to claim 1, wherein the storage means comprises means for identifying the processing application linked to a virtual image view.

5. The system for producing a virtual image view according to claim 4, wherein the storage means comprises a lookup table linking a camera identifier with conversion information for generation of the virtual image view required by the processing application.

6. The system for producing a virtual image view according to claim 1, wherein the conversion information includes calibration parameters for an identified image capture means, and wherein the processing means is configured to verify the calibration parameters for each of the one or more image capture means.

7. A vehicle comprising the system according to claim 1.

8. A method for producing a virtual image view for a vehicle, comprising:
receiving image data captured by at least one image capture means from surroundings of the vehicle, the image data being defined at least in part by first viewpoint parameters;
receiving an identifier identifying one or more image capture means providing the image data;
identifying, among a plurality of processing applications comprising at least two among an object detection and tracking application and a lane identifier application, a processing application expecting viewpoint parameters;
selecting the processing application expecting viewpoint parameters;
determining a virtualization record among the virtualization records containing conversion information related to a virtualized viewpoint, a plurality of image capture means, and the plurality of processing applications, wherein the virtualization record is determined at least based on the identifier and the identified processing application;
converting the first viewpoint parameters of the captured image data into the virtual viewpoint parameters of the selected processing application based on the conversion information associated with the determined virtualization record and the identified processing application, to result in the virtual image view; and
executing at least one driver assistance and/or automated driving function based on the virtual image view.

9. The method for producing a virtual image view for a vehicle according to claim 8, wherein the conversion information comprises at least one of distortion compensation information, image rectification information, image refraction information, and rotational information.

10. The method for producing a virtual image view according to claim 8, wherein each virtualized viewpoint is defined by at least one of a resolution and a field of view; and
at least one of a pinhole model, a fisheye model, a cylindrical model, a spherical model, and a rectilinear model.

11. The method for producing a virtual image view according to claim 8, wherein the determining includes identifying the processing application linked to a virtual image view.

12. The method for producing a virtual image view according to claim 11, wherein the determining includes searching a lookup table, the lookup table including information linking a camera identifier with conversion information for generation of the virtual image view required by the processing application.

13. The method for producing a virtual image view according to claim 8, wherein the conversion information includes calibration parameters for an identified image capture means, and the method further comprising verifying the calibration parameters for each of the one or more image capture means.

* * * * *